3,141,921
ZOOM VIEWFINDER WITH FRONT DIAPHRAGM MASK

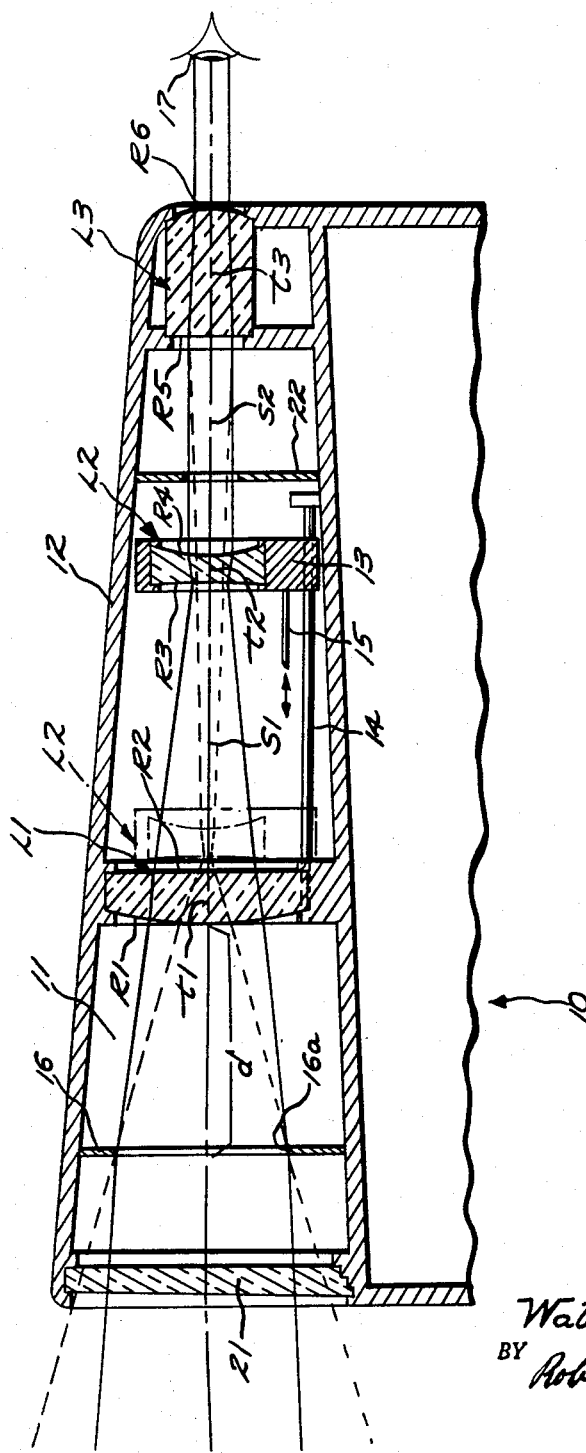
July 21, 1964     W. R. LINKE     3,141,921
ZOOM VIEWFINDER WITH FRONT DIAPHRAGM MASK
Filed Dec. 14, 1959
INVENTOR.
Walter R. Linke

Walter R. Linke, Chicago, Ill., assignor to Bell & Howell Company, Chicago, Ill., a corporation of Illinois
Filed Dec. 14, 1959, Ser. No. 859,379
6 Claims. (Cl. 88—1.5)

This invention relates to a zoom viewfinder, and more particularly to a zoom viewfinder in which a framing diaphragm or mask is of constant apparent size during zooming.

An object of the invention is to provide a zoom viewfinder in which a framing diaphragm is positioned in front of the front lens element a distance such that the aperture has a constant apparent size throughout the zooming range.

Another object of the invention is to provide a zoom viewfinder having fixed field and eye-piece lenses and a negative lens movable therebetween for zooming together with a front mask positioned such a distance in front of the front lens that the apparent size of the mask aperture is constant throughout the movement of the negative lens.

A complete understanding may be obtained from the following detailed description of a zoom viewfinder forming a specific embodiment thereof, when read in conjunction with the appended drawing, in which the single figure is a longitudinal section of a zoom viewfinder constituting one embodiment of the invention.

It is to be understood that terms "front" and "rear" as used herein refer respectively to the left and right as viewed in the drawing.

The invention provides a zoom viewfinder in which a negative component is movable between a field lens component and an eye-piece component, and a mask or diaphragm is positioned in front of the field lens component a distance such that, throughout the range of movement of the negative component, the apparent size of the mask aperture is substantially constant.

Referring now in detail to the drawing, there is shown therein a camera 10 having an elongated, tunnel-like viewfinder chamber 11 at the top of housing 12, and the chamber 11 is completely enclosed along the sides and open at the ends thereof. A zoom lens system mounted in the chamber 11 comprises a fixed front or field lens positive singlet component $L_1$, an axially movable intermediate negative singlet zooming component $L_2$ and a fixed positive singlet eye-piece component $L_3$. These components have spherical surfaces designated by radii $R_1$ to $R_6$, axial thicknesses $t_1$ to $t_3$ and axial separations $s_1$ and $s_2$. The component $L_2$ is mounted in a lens cell 13 mounted slidably on rods 14 extending parallel to the optical axis, and a flexible member 15 may be actuated by manually operable means (not shown) to move the component $L_2$ to any point along the zooming range from the extreme telephoto position of the component $L_2$ shown in full lines to the extreme wide angle position shown in broken lines. The lens system is substantially afocal throughout this zooming range.

To cause the apparent size of an aperture 16a in mask or diaphragm 16 to be constant to eye 17 of a user, the mask is fixed in the position shown at a distance $d$ from the front surface of the component $L_1$. The distance $d$ may be derived from the following formula:

$$d = \frac{T - rW}{r - 1}$$

where T is the distance of the entrance pupil from the surface $R_1$ for the extreme telephoto position, W is the distance of the entrance pupil from the surface $R_1$ for the extreme wide angle position and r is the range of magnification expressed as the telephoto magnification divided by the wide angle magnification.

Mounted at the front of the viewfinder is a weak prism 21, which is provided for parallax compensation. A rear mask 22 is provided for substantially eliminating reflection. However, the aperture 16a in mask 16 alone is effective to control the area of the light path, being the most restrictive of the apertures including that in the mask 22 and the chamber 11.

Preferred embodiments of the invention were constructed in compliance with the following tables in which dimensions are in terms of inches, $n_d$ designates the indices of refraction for the sodium D line and V the Abbe dispersion numbers:

Example I

[Mask aperture $16d = .900$ by $.675$. Zoom range $= 3:1$. Magnification range $= .43\times$ to $1.30\times$]

| | | | | |
|---|---|---|---|---|
| $L_1$ | $R_1 = +1.422$ | $d = 1.040$ | | |
| | $R_2 =$ Plano | $t_1 = .210$ | $n_d = 1.523$ | $V = 58.6$ |
| | | $s_1 = 1.100$ to $.050$ | | |
| $L_2$ | $R_3 = -4.900$ | $t_2 = .100$ | $n_d = 1.605$ | $V = 38.0$ |
| | $R_4 = +.625$ | $s_2 = .840$ to $1.890$ | | |
| $L_3$ | $R_5 =$ Plano | $t_3 = .455$ | $n_d = 1.523$ | $V = 58.6$ |
| | $R_6 = -2.037$ | | | |

Example II

[Mask aperture $16a = .900$ by $.675$. Zoom range $= 3:1$. Magnification range $= .43\times$ to $1.30\times$]

| | | | | |
|---|---|---|---|---|
| $L_1$ | $R_1 = +1.422$ | $d = 1.335$ | | |
| | $R_2 =$ Plano | $t_1 = .210$ | $n_d = 1.523$ | $V = 58.6$ |
| | | $s_1 = 1.100$ to $.050$ | | |
| $L_2$ | $R_3 = 2.349$ | $t_2 = .100$ | $n_d = 1.605$ | $V = 38.0$ |
| | $R_4 = +.733$ | $s_2 = .840$ to $1.890$ | | |
| $L_3$ | $R_5 =$ Plano | $t_3 = .455$ | $n_d = 1.523$ | $V = 58.6$ |
| | $R_6 = -2.037$ | | | |

The apparent size of the mask aperture 16a remains substantially constant throughout the zooming range of the above lens system, and this is obtained with the very simple construction of the lens system.

While the invention is thus described, it is not wished to be limited to the precise details described, as changes may be readily made without departing from the spirit of the invention.

What is claimed is:

1. In a zoom viewfinder, a fixed front component of one sign, a fixed rear component of the same sign as that of the front component, an intermediate zooming component of the sign opposite to that of the front and rear components and movable along the optical axis to vary magnification, and a front diaphragm spaced an axial distance $d$ from the front surface of the front component, the viewfinder being constructed substantially in compliance with the following formula:

$$d = \frac{T - rW}{r - 1}$$

where T is the distance of the entrance pupil from the front surface of the front component for the extreme telephoto position of the zooming component, W is the distance of the entrance pupil from the front surface of the front component for the extreme wide angle position of the zooming component and r is the range of magification expressed as the quotient of the telephoto magification divided by the wide angle magnification.

2. The zoom viewfinder of claim 1 wherein the front and rear components are positive and the zooming component is negative.

3. The zoom viewfinder of claim 1 wherein the front component is a convex plano singlet convex forwardly, the rear component is a plano convex singlet convex rearwardly, and the zooming component is a biconcave singlet predominantly concave rearwardly.

4. The zoom viewfinder of claim 1 and including a prism positioned in front of the diaphragm for parallax correction.

5. In a zoom viewfinder, proceeding from front to rear, a fixed diaphragm mask, a fixed positive singlet front component, an axially movable biconcave zooming component, a fixed positive singlet rear component, and being further characterized in that the viewfinder conforms substantially to the following table in which dimensions are in terms of inches, and proceeding from front to rear $L_1$ to $L_3$ designate the lenses, $R_1$ to $R_6$ the radii of curvature of the surfaces, $t_1$ to $t_3$ the axial thicknesses, $s_1$ and $s_2$ the axial separations of the components, $d$ the axial separation of the mask and the front component, $n_d$ the indices of refraction for the sodium D line and V the Abbe dispersion numbers:

| | | | | |
|---|---|---|---|---|
| $L_1$ | $R_1=+1.422$<br>$R_2=$Plano | $d=1.040$<br>$t_1=.210$<br>$s_1=1.100$ to $.050$ | $n_d=1.523$ | $V=58.6$ |
| $L_2$ | $R_3=-4.900$<br>$R_4=+.625$ | $t_2=.100$<br>$s_2=.840$ to $1.890$ | $n_d=1.605$ | $V=38.0$ |
| $L_3$ | $R_5=$Plano<br>$R_6=-2.037$ | $t_3=.455$ | $n_d=1.523$ | $V=58.6$ |

6. In a zoom viewfinder, proceeding from front to rear, a fixed diaphragm mask, a fixed positive singlet front component, an axially movable biconcave zoom component, a fixed positive singlet rear component, and being further characterized in that the viewfinder conforms substantially to the following table in which dimensions are in terms of inches, and proceeding from front to rear $L_1$ to $L_3$ designate the lenses, $R_1$ to $R_6$ the radii of curvature of the surfaces, $t_1$ to $t_3$ the axial thicknesses, $s_1$ and $s_2$ the axial separations of the components, $d$ the axial separation of the mask and the front component, $n_d$ the indices of refraction for the sodium D line and V the Abbe dispersion numbers:

| | | | | |
|---|---|---|---|---|
| $L_1$ | $R_1=+1.422$<br>$R_2=$Plano | $d=.950$<br>$t_1=.210$<br>$s_1=1.100$ to $.050$ | $n_d=1.523$ | $V=58.6$ |
| $L_2$ | $R_3=-2.349$<br>$R_4=+.733$ | $t_2=1.100$<br>$s_2=.840$ to $1.890$ | $n_d=1.605$ | $V=38.0$ |
| $L_3$ | $R_5=$Plano<br>$R_6=-2.037$ | $t_3=.455$ | $n_d=1.523$ | $V=58.6$ |

References Cited in the file of this patent

UNITED STATES PATENTS

| | | |
|---|---|---|
| 1,879,412 | Mueller | Sept. 27, 1932 |
| 2,043,900 | Mihalyi | June 9, 1936 |
| 2,859,654 | Back | Nov. 11, 1958 |

FOREIGN PATENTS

| | | |
|---|---|---|
| 273,130 | Switzerland | Apr. 16, 1951 |
| 294,713 | Switzerland | Feb. 1, 1954 |